(12) United States Patent
Aman et al.

(10) Patent No.: US 6,192,088 B1
(45) Date of Patent: Feb. 20, 2001

(54) CARRIER RECOVERY SYSTEM

(75) Inventors: Ahmad K. Aman, Fairfax, VA (US); Cecil William Farrow, Highlands Borough, NJ (US); Hong Jiang, Montclair, NJ (US); Agesino Primatic, Jr., Frenchtown, NJ (US); Charles Albert Webb, III, Rumson Borough, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/052,455

(22) Filed: Mar. 31, 1998

(51) Int. Cl.$^7$ .......................... H04L 27/14; H04L 27/16; H04L 27/22
(52) U.S. Cl. .................. 375/326; 455/192.2; 455/164.1; 455/182.2; 455/182.3; 455/180.3
(58) Field of Search .................................... 375/326, 327, 375/375, 376, 344, 354; 455/192.2, 164.1, 182.2, 182.3, 180.3

(56) References Cited

U.S. PATENT DOCUMENTS

| | | | |
|---|---|---|---|
| 4,336,616 | * 6/1982 | Carson et al. | 455/202 |
| 4,689,804 | * 8/1987 | Srinivasagopalan et al. | 375/376 |
| 5,065,107 | * 11/1991 | Kumar et al. | 329/308 |
| 5,276,716 | * 1/1994 | Winen | 375/376 |
| 5,440,587 | * 8/1995 | Ishikawa et al. | 375/332 |
| 5,487,186 | * 1/1996 | Scarpa | 455/192.2 |
| 5,671,253 | * 9/1997 | Stewart | 375/316 |
| 5,737,694 | * 4/1998 | McMahill et al. | 455/76 |
| 5,912,930 | * 6/1999 | Iwasaki | 375/329 |
| 5,949,832 | * 9/1999 | Liebetreu et al. | 375/344 |

\* cited by examiner

*Primary Examiner*—Stephen Chin
*Assistant Examiner*—Mohammad Ghayour

(57) ABSTRACT

A digital carrier recovery system includes at least two modes of operation, namely, an acquisition mode and a tracking mode. The bandwidth of the carrier recovery loop filter is different for the acquisition mode and the tracking mode. In the acquisition mode, the digital phase-locked loop seeks and locks to the long term frequency offset of the received carrier signal. In the tracking mode, the digital phase-locked loop tracks the instantaneous variations in the carrier phase. Switching between the acquisition mode and the tracking mode is realized digitally, and includes programmable hysteresis, resulting in optimal performance in the presence of signals having high levels of phase noise (jitter). More specifically, the carrier recovery loop filter "locks" to the pilot signal of an incoming signal, e.g., a vestigial side band (VSB) video signal, by employing a so-called digital vector tracking phase-locked loop that demodulates the VSB signal. The digital vector tracking phase-locked loop includes a complex filter, i.e., a so-called vector tracking filter, that very quickly locks to the pilot signal of the passband VSB signal and once locked to the pilot signal, switches to the tracking mode that provides significantly better tracking of phase noise. The demodulation is achieved by employing a complex multiplication of the incoming signal with a complex exponential sequence to obtain an in-phase (I-phase) component and a quadrature-phase (Q-phase) component. The complex exponential sequence is generated, in one embodiment, by employing a SIN/COS look up table that is driven by a phase difference signal generated by the digital vector tracking phase-locked loop. A residual direct current (dc) component in the I-phase component caused by the pilot signal is removed, resulting in a baseband I/Q signal. A technical advantage of this carrier recovery invention is that the bandwidth of the phase-locked loop filter can be different for the acquisition mode and the tracking mode. This allows for optimal performance in both the acquisition and tracking modes of operation.

46 Claims, 5 Drawing Sheets

109

CARRIER RECOVERY SYSTEM

RELATED APPLICATIONS

U.S. patent application Ser. No. 09/052,454 was filed concurrently herewith. U.S. patent applications of C. W. Farrow Ser. No. 08/777,889 and Ser. No. 08/777,893 were filed on Dec. 31, 1996, now U.S. Pat. No. 5,963,594 issued on Oct. 5, 1999 and U.S. Pat. No. 5,870,442 issued on Feb. 9, 1999, respectively.

TECHNICAL FIELD

This invention relates to demodulator arrangements and, more particularly, to carrier recovery in such demodulator arrangements.

BACKGROUND OF THE INVENTION

Prior known carrier recovery systems were typically analog systems. Such systems had relatively slower response and did not track carrier phase variations very well. Additionally, the prior known systems did not track phase difference very well, in the presence of phase noise (jitter), thereby resulting in unsatisfactory performance.

SUMMARY OF THE INVENTION

These and other problems of prior known carrier recovery systems are overcome by employing a digital carrier recovery system including a loop filter having at least two modes of operation, namely, an acquisition mode and a tracking mode. The bandwidth of the carrier recovery loop filter is different for the acquisition mode and the tracking mode. In the acquisition mode, the digital phase-locked loop seeks and locks to the long term frequency offset of the received carrier signal. In the tracking mode, the digital phase-locked loop tracks the instantaneous variations in the carrier phase. Switching between the acquisition mode and the tracking mode is realized digitally, and includes programmable hysteresis, resulting in optimal performance in the presence of signals having high levels of phase noise (jitter).

More specifically, the carrier recovery loop filter "locks" to the pilot signal of an incoming signal, e.g., a vestigial side band (VSB) video signal, by employing a so-called digital vector tracking phase-locked loop which demodulates the VSB signal. The digital vector tracking phase-locked loop includes a complex filter, i.e., a so-called vector tracking filter, which very quickly locks to the pilot signal of the passband VSB signal and once locked to the pilot signal, switches to the tracking mode which provides significantly better tracking of phase noise.

The demodulation is achieved by employing a complex multiplication of the incoming signal with a complex exponential sequence to obtain an in-phase (I-phase) component and a quadrature-phase (Q-phase) component. The complex exponential sequence is generated, in one embodiment, by employing a SIN/COS look up table that is driven by a phase difference signal generated by the digital vector tracking phase-locked loop. A residual direct current (dc) component in the I-phase component caused by the pilot signal is removed, resulting in a baseband I/Q signal.

A technical advantage of this carrier recovery invention is that the bandwidth of the phase-locked loop filter can be different for the acquisition mode and the tracking mode. This allows for optimal performance in both the acquisition and tracking modes of operation.

DETAILED DESCRIPTION

Figure 1:
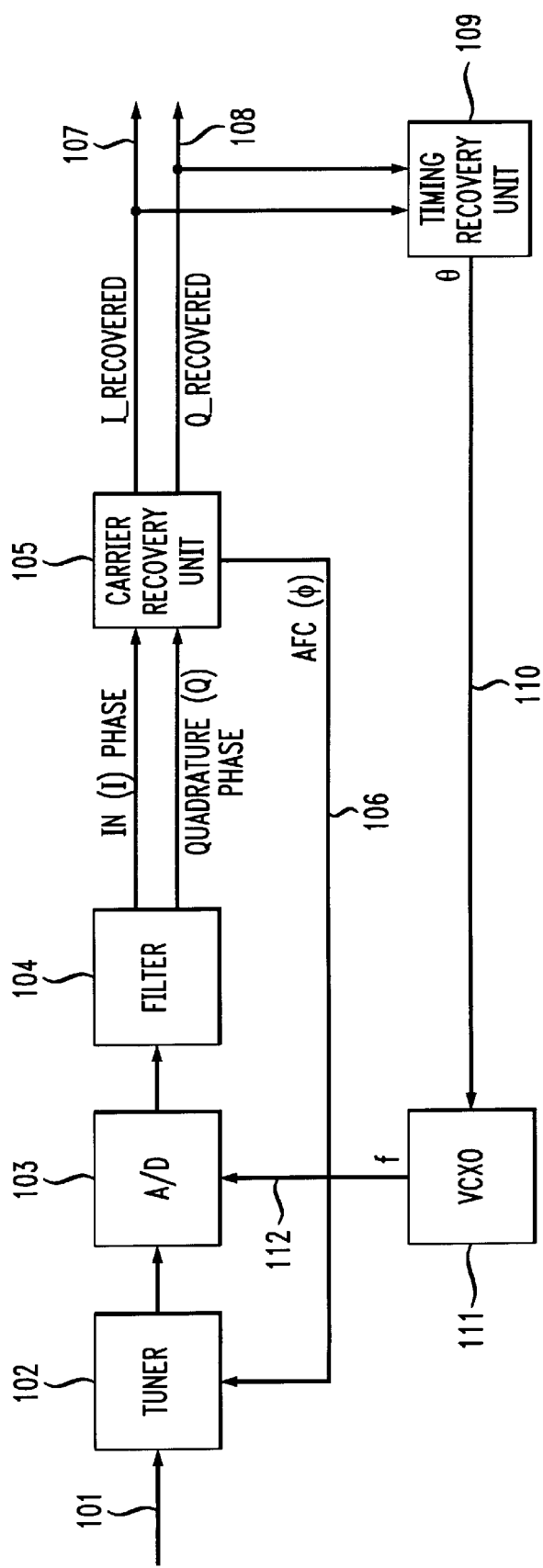
FIG. 1 illustrates, in simplified block diagram form, portions of a demodulator employing an embodiment of the invention.

FIG. 1 shows, in simplified block diagram form details of a portion of a demodulator 100 that employs an embodiment of the invention. Demodulator 100 includes, in this example, apparatus 101 for receiving an incoming signal, for example, a digital video signal which, in turn, is supplied to turner 102 of a type known in the art. Also supplied to turner 102 is an automatic frequency control (AFC) signal, namely, phase $\phi$, for controlling turner 102 to stay tuned to a desired incoming signal frequency. It should be noted that for completeness of exposition turner 102 is shown as being adjusted by AFC ($\phi$), in many applications adjustment of turner 102 is not required. An intermediate frequency signal output from turner 102 is supplied to analog-to-digital (A/D) converter 103. Also supplied to A/D 103 is a timing signal f at a predetermined frequency. A digital version of the intermediate frequency signal is supplied to filter 104. Filter 104 is a matched filter, of a type well known in the art, which performs matched filtering, decimation and a Hilbert transform of the digital samples from A/D 103 to yield separate In (I) phase (I-phase) and Quadrature (Q) phase (Q-phase) passband components. The I-phase and Q-phase components are supplied to carrier recovery unit 105. As will be explained in detail below, carrier recovery unit 105 generates an In phase recovered (I-Recovered) component and a Quadrature phase Recovered (Q-Recovered) component, as well as, the AFC signal. The AFC signal is supplied via circuit path 106 to turner 102, while I-Recovered and Q-Recovered are supplied via circuit paths 107 and 108, respectively, to additional portions of the demodulator (not shown) and to timing recovery unit 109. In turn, timing recovery unit 109 generates timing control signal, i.e., phase $\theta$, which is supplied to voltage controlled crystal oscillator (VCXO) 11. VCXO 111 is responsive to timing control signal $\theta$ to generate timing signal f, which is supplied via circuit path 112 to A/D 103.

Figure 2:
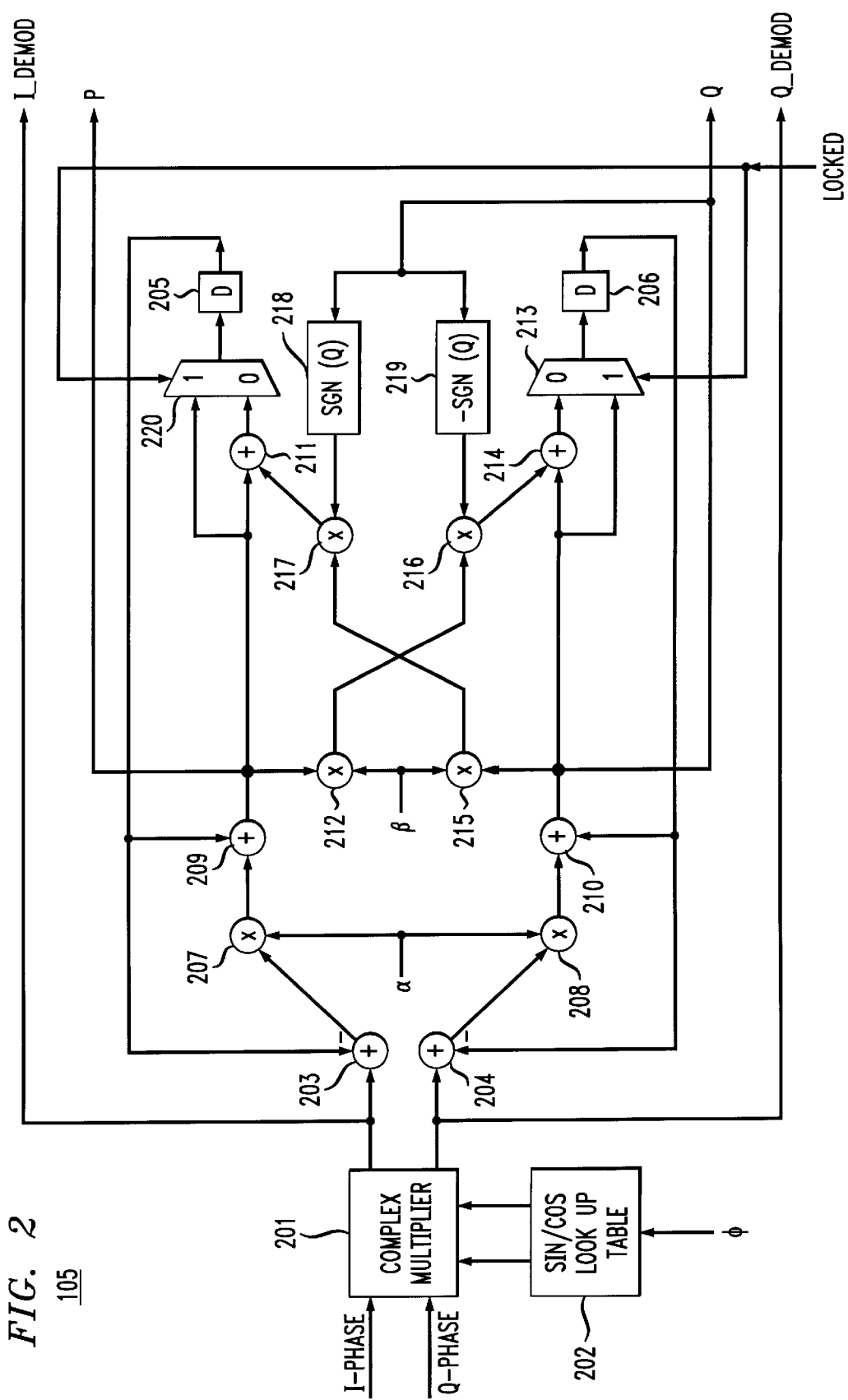
FIGS. 2, 3 and 4 illustrate, in simplified block diagram form, details of the carrier recovery unit of FIG. 1.
Figure 3:
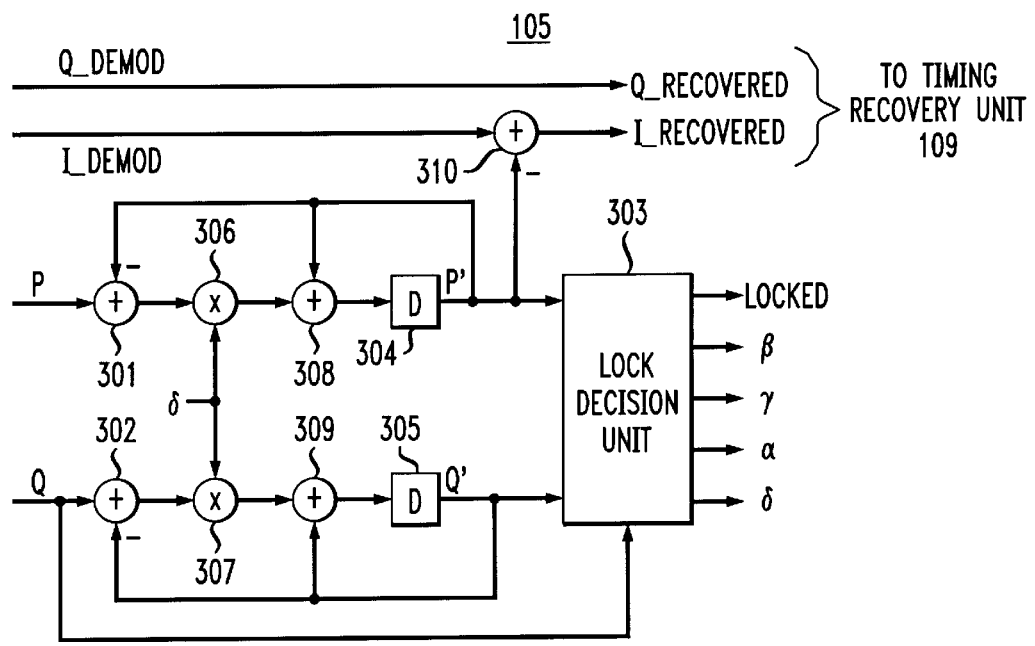
Figure 4:
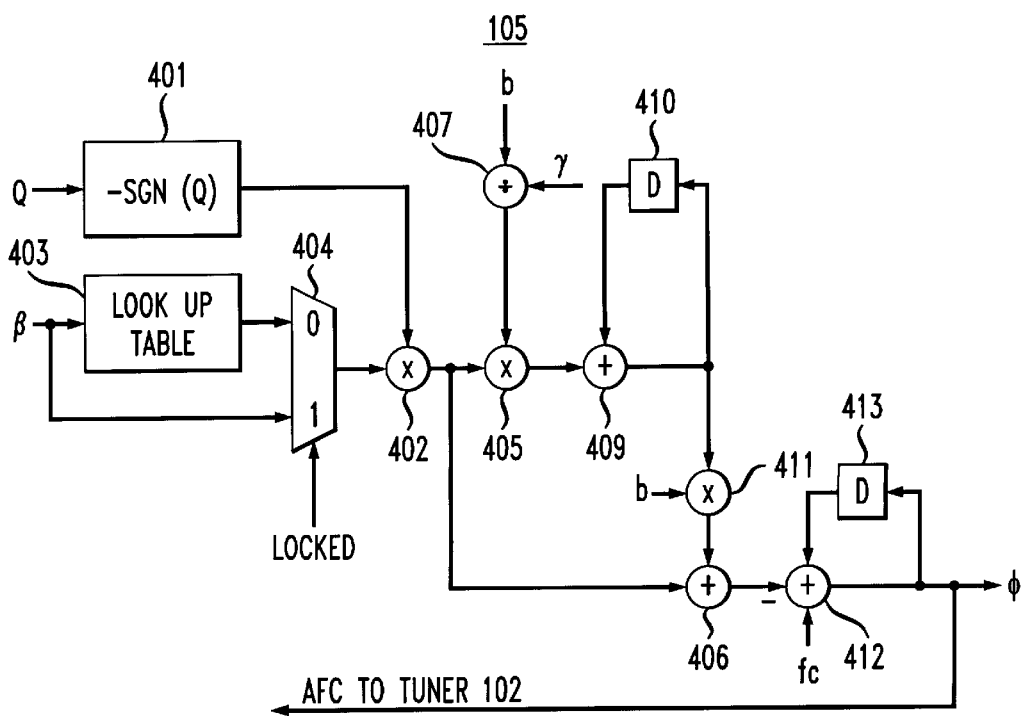

FIGS. 2, 3 and 4 show, in simplified form, details of an embodiment of carrier recovery unit 105. Referring to FIG. 2, shown is complex multiplier 201 to which the I-phase and Q-phase signal components are supplied. Complex multiplier 201 in conjunction with SIN/COS look up table 202 demodulates the I-phase and Q-phase signal components to obtain signals representative of I_demod and Q_demod, respectively. The demodulation is realized by complex multiplication of the I-phase and Q-phase signal components with a complex exponential sequence. The exponential sequence is supplied by SIN/COS look up table 202 in response to frequency control signal $\phi$. Such complex multiplier arrangements used for demodulation are well known in the art. The value of I_demod is supplied to one input of combining unit 203 and the value of Q_demod is supplied to one input of combining unit 204. An output from standard delay (D) unit 205 is supplied to a negative input of combining unit 203 and to an input of combining unit 209. Similarly, an output from standard delay (D) unit 206 is supplied to a negative input of combining unit 204 and to an input of combining unit 210. Standard delay units 205 and 206 are, for example, infinite impulse response (IIR) filters of a type known in the art. Constant $\alpha=2^{-W}$ is supplied to multipliers 207 and 208 to realize exponential smoothing of outputs from combining units 203 and 204, respectively. It should be noted that W is as large as practical in the tracking mode of operation. In this example for carrier recovery, W has a range of 5–14 and for the acquisition mode ($\alpha_1$) W=12 and for the tracking mode ($\alpha_1$) W=6. Combining unit 209 combines the output of multiplier 207 and the output standard delay unit 205 to obtain P. P (first average) is an average of I_demod. P is supplied to the 1 input of selector 210, to an input of combining unit 211 and an input of multiplier 212. Similarly, combining unit 210 combines the output of multiplier 208 and the output standard delay unit 206 to obtain Q. Q (second average) is an average of Q_demod. Q is supplied to the I input of selector 213, to an input of combining unit 214, an input of multiplier 215, to −sgn (sign) (Q) unit 219 and to sgn(Q) unit 218. $\beta=2^{-X}$ is supplied to an input of each of multipliers 212 and 215. In this example for carrier recovery, X has a range of 3–12. In the acquisition mode X=4 ($\beta_0$), X=8 ($\beta_1$) or ($\beta_2$) X=10 which provide a number of step changes in the phase during the acquisition mode of operation of the vector tracking, i.e., complex, filter, as shown below. Thus, it is seen that $\beta_0$, $\beta_1$ and $\beta_2$ are first, second and third predetermined phase values, respectively. In FIG. 2, when in the tracking mode $\beta$ is not employed because the values of P and Q are not modified or adjusted. The output from multiplier 212 is an adjusted version of P that is supplied to an input of multiplier 216 and the output from multiplier 215 is an adjusted version of Q that is supplied to an input of multiplier 217. A signal representative of −sgn (Q) is supplied from −sgn (Q) unit 219 to multiplier 216 and a signal representative of sgn (Q) is supplied from sgn (Q) unit 218 to an input of multiplier 217. The resulting output from multiplier 217 is supplied to combing unit 211, where it is algebraically added to adjust the value of P. The resulting output from combining unit 211 is supplied to the 0 input of selector 210. The resulting output from multiplier 216 is supplied to combing unit 214 where it is algebraically added to adjust the value of Q. The resulting output from combining unit 211 is supplied to the 0 input of selector 213. An output from selector 210 is supplied to the input of standard delay unit 205 and an output from selector 213 is supplied to the input of standard delay 206. The mode of operation, i.e., acquisition or tracking, is controlled by a "locked" signal supplied to selectors 210 and 213 to select as an output the signal supplied to either the 0 input or the 1 input. Note that in the acquisition mode (0) the adjusted values of P and Q are selected which enable locking to the carrier more rapidly. In the tracking mode (1) the non-adjusted values of P and Q are used that have been obtained by employing the smaller values of $\alpha$ and $\beta$. Again, the use of the non-adjusted values of P and Q provides significantly better tracking of phase in the presence of phase noise. Generation of the locked signal and the adjustment of parameters $\alpha$ and $\beta$ are described below in relationship to FIG. 3. It is noted that for the acquisition mode of operation that $\alpha$ is large in order to obtain the average of P and Q. The use of the larger value of $\alpha$ is desirable to "lock" onto the carrier phase rapidly. However in the tracking mode $\alpha$ is smaller in value than that used in the acquisition mode. Otherwise, it is difficult to track the phase in the presence of phase noise. Thus it can be shown by employing the relatively large values of $\alpha$ and $\beta$ relatively fast convergence is obtained initially during the acquisition mode and then relatively quiet operation of the vector tracking filter of FIG. 2 is realized in the tracking mode by employing the smaller values of $\alpha$ and $\beta$. One such vector tracking filter is disclosed in co-pending U.S. patent application of C. W. Farrow Ser. No. 08/777,889, filed Dec. 31, 1996, now U.S. Pat. No. 5,963,594 issued Oct. 5, 1999 and assigned to the assignee of this patent application. Note that $\alpha$, $\beta$ and locked are supplied from lock decision unit 303 (FIG. 3).

Referring now to FIG. 3, it is shown that P is supplied to an input of combining unit 301 while Q is supplied to one input of combining unit 302. Q is also supplied to lock decision unit 303. An output of standard delay (D) unit 304, namely, P', is supplied to a negative input of combining unit 301, where it is algebraically subtracted from P, to an input of combining unit 308, to an input of combining unit 310 and to lock decision unit 303. P' (third average) is an average of P and is referred to as a second average of I_demod. An output of standard delay (D) unit 305, namely, Q', is supplied to a negative input of combining unit 302, where it is algebraically subtracted from Q, to an input of combining unit 309 and to lock decision unit 303. Again, in this example, standard delay units 304 and 305 are IIR filters. Q' (fourth average) is an average of Q and is referred to as a second average of Q_demod. An output from combining unit 301 is supplied to multiplier 306 and an output from combining unit 302 is supplied to multiplier 307. Also supplied to multipliers 306 and 307 is parameter $\delta=2^{-Z}$ from lock decision unit 303. In this example, Z has a range of 12–18 and typically is 16. The outputs of multipliers 306 and 307 are adjusted values of the outputs from combing units 301 and 302, respectively, and are supplied to combining units 308 and 309, respectively. The adjusted values of P and Q from combining units 308 and 309 are supplied to standard delay units 304 and 305, respectively, which yield the third and fourth average values P' and Q', respectively. Lock decision unit 303 is operative to generate the "locked" signal for controlling carrier recovery unit 105 to be in the acquisition mode or the tracking mode and to provide parameters $\alpha$, $\beta$, $\gamma$ and $\delta$. I_demod is supplied to one input of combining unit 310 and P' is supplied to another input where it is algebraically subtracted from I_demod. This subtraction of P' removes the direct current (D.C.) pilot signal to yield I_recovered. As indicated Q_demod is also Q_recovered. Q_recovered and I_recovered are supplied to other portions of the demodulator and to timing recovery unit 109.

The operational mode, i.e., acquisition or tracking, of carrier recovery system 105 and the values of parameters $\alpha$, $\beta$, $\gamma$ and $\delta$ are determined by lock decision unit 303. In the following process $\gamma=2^{-Y}$, $k=2^{-M}$, $S=2^{-N}$ and $b=2^{-O}$. The locking decision is determined, in one example, by prescribed criteria as follows:

if $(|Q'|<(|P'|\cdot 2^{-U}))$ then
    $\beta=\beta_0$, $\gamma=\gamma_0$, c=c+1
else if $(|Q'|<(|P'|\cdot 2^{-V}))$ then
    $\beta=\beta_1$, $\gamma=\gamma_1$, c=0
else
    $\beta=\beta_2$, $\gamma=\gamma_2$, c=0
end if
if (c≧L) then
    locked=1
    c=L
    $\beta=Q\cdot 2^{-M}$
else
    locked=0
end if

```
if (locked=0) then
    α=α₁
else
    α=α₀
end if
δ=δ₀−α
```

Parameters $\alpha_0$, $\alpha_1$, $\beta_0$, $\beta_1$, $\beta_2$, $\gamma_0$, $\gamma_1$, $\gamma_2$, $\delta_0$, k, $S_1$, $S_2$, and L are tunable parameters that depend on the particular characteristics of turner 102 (FIG. 1) that is being employed to receive the incoming signal. Predetermined values of these parameters are stored in lock decision unit 303.

Note that programmable hysteresis is obtained in the locking decision process by the selection of the value of, which is a predetermined number, L and the use of counter c. Through the selection of the value of L the duration of the interval before which a locking decision is made can be adjusted as desired. Additionally, counter c is incremented during a portion of the acquisition decision process and set to zero (0) during other portions of the acquisition process, as indicated above. Once the mode is switched from acquisition to tracking, the value of counter c is set to c=L. Thus, the desired hysteresis is realized in switching from the acquisition mode to the tracking mode and also from the tracking mode back to the acquisition mode. During the acquisition mode the bandwidth is set to a first predetermined bandwidth which is narrower than during the second predetermined bandwidth set to the tracking mode. This is because a larger value for α is employed than in the tracking mode. Further, the phase during the tracking mode is linear because Q is linear and a fixed shift is realized in the linear phase because k is a fixed value, as shown above.

In summary, the parameters in this example for carrier recovery unit 105 are by way of example only, as follows:

$\alpha_1, \alpha_1$: range of W: 5–14
   typical values: $\alpha_0$, W=6,
     $\alpha_1$, W=12;
$\beta_0, \beta_1, \beta_2$: range of X: 3–12
   typical values: $\beta_0$, X=4,
     $\beta_1$, X=8,
     $\beta_2$, X=10;
$\gamma_0, \gamma_1, \gamma_2$, range of Y: 5–14
   typical values: $\gamma_0$, Y=6,
     $\gamma_1$, Y=8,
     $\gamma_2$, Y=10;
$\delta_0$ range of Z: 12–18
   typical value: $\delta_0$, Z=16;
k range of M: 2–8
   typical value: k, M=4;
$S_1, S_2$ range of N: 2–4
   typical values: $S_1$, N=4,
     $S_2$, N=2;
L range: 16384–65536
   typical value: L=32768;
b range O: 10–16
   typical value: O=14.

FIG. 4 shows, in simplified form, further details of carrier recovery unit 105. Shown is Q being supplied to −sgn (Q) unit 401. The obtained −sign value of Q is supplied to an input of multiplier 402. Parameter β is supplied from lock decision unit 303 (FIG. 3) to an input of look table 403 and to a one (1) input of selector 404. An output from look up table 403 is supplied to the zero (0) input of selector 404. Look up table 403 in response to a supplied value of β, outputs a corresponding phase_error value. To this end, $$\text{phase\_error} = \frac{2^{B-\beta}}{2\pi},$$

where B is the bitwidth of frequency control signal φ and, in this example, has a typical value of B=16. Typical values of the phase_error, for this example, are from an approximation of the above phase error equation, namely, $$\text{phase\_error} \approx \frac{10430}{2^{\beta}}$$

and are:

| β | phase error |
|---|---|
| 0 | 10430 |
| 1 | 5215 |
| 2 | 2608 |
| 3 | 1304 |
| 4 | 652 |
| * | * |
| * | * |
| * | * |
| 10 | 10. |

The state of the locked signal that is supplied to selector 404 depends on the mode of operation of carrier recovery unit 105. As indicated above, locked is 0 for the acquisition mode and 1 for the tracking mode. The phase_error is multiplied by the −sgn (Q) via multiplier 402 and the result is supplied to multiplier 405 and an input of combining unit 406. Also supplied to multiplier 405 is the result of the division of b and γ by divider 407. The parameter b=$2^{-O}$ and the parameter γ=$2^{-Y}$. Typical values for b and γ are shown above. An output from multiplier 405 in supplied to one input of combing unit 409 and an output from standard delay (D) unit 410, which is a delayed version of the output from combining unit 409, is supplied to another input of combining unit 409, where it is algebraically added to the output from multiplier 405. An output from combining unit 409 is representative of the accumulation of the carrier frequency offset and is supplied to an input of standard delay unit 410 and to an input of multiplier 411. Standard delay unit 410 is also an IIR filter, in this example. Parameter b is supplied to another input of multiplier 411 to be multiplied with the output from combining unit 409. A resulting output from multiplier 411 is supplied to another input of combining unit 406 where it is algebraically added to the output from multiplier 402. An output from combining unit 406 is supplied to an input of combining unit 412. A modulation frequency value (fc) is supplied to a subtracting input of combining unit 412, while a delayed version of an output from combining unit 412 is supplied via standard delay (D) unit 413 to another input of combining unit 412. Standard delay units 410 and 412 are, in this example, also IIR filters. The supplied inputs are algebraically combined via combing unit 412 to yield frequency control signal φ. Frequency control signal φ is supplied to other portions of the demodulator (not shown) and as automatic frequency control signal φ (AFC) to turner 102 (FIG. 1). Note that the bitwidth of frequency control signal φ is typically B=16.

The bitwidth F employed in delay unit 410 (FIG. 4) is determined by a predetermined formula as follows:

F=O+w, where $$w = \log_2\left(\frac{\text{max. carrier} \cdot \text{freq. offset}}{\text{symbol} \cdot \text{freq.}} \cdot 2^B\right) + 1 \text{ and}$$

typical values for the max. carrier. freq. offset are: ±150 kHz, a typical symbol. freq. value is 10.76 MHz and, as indicated above, a typical value for B is 16.

Figure 5:
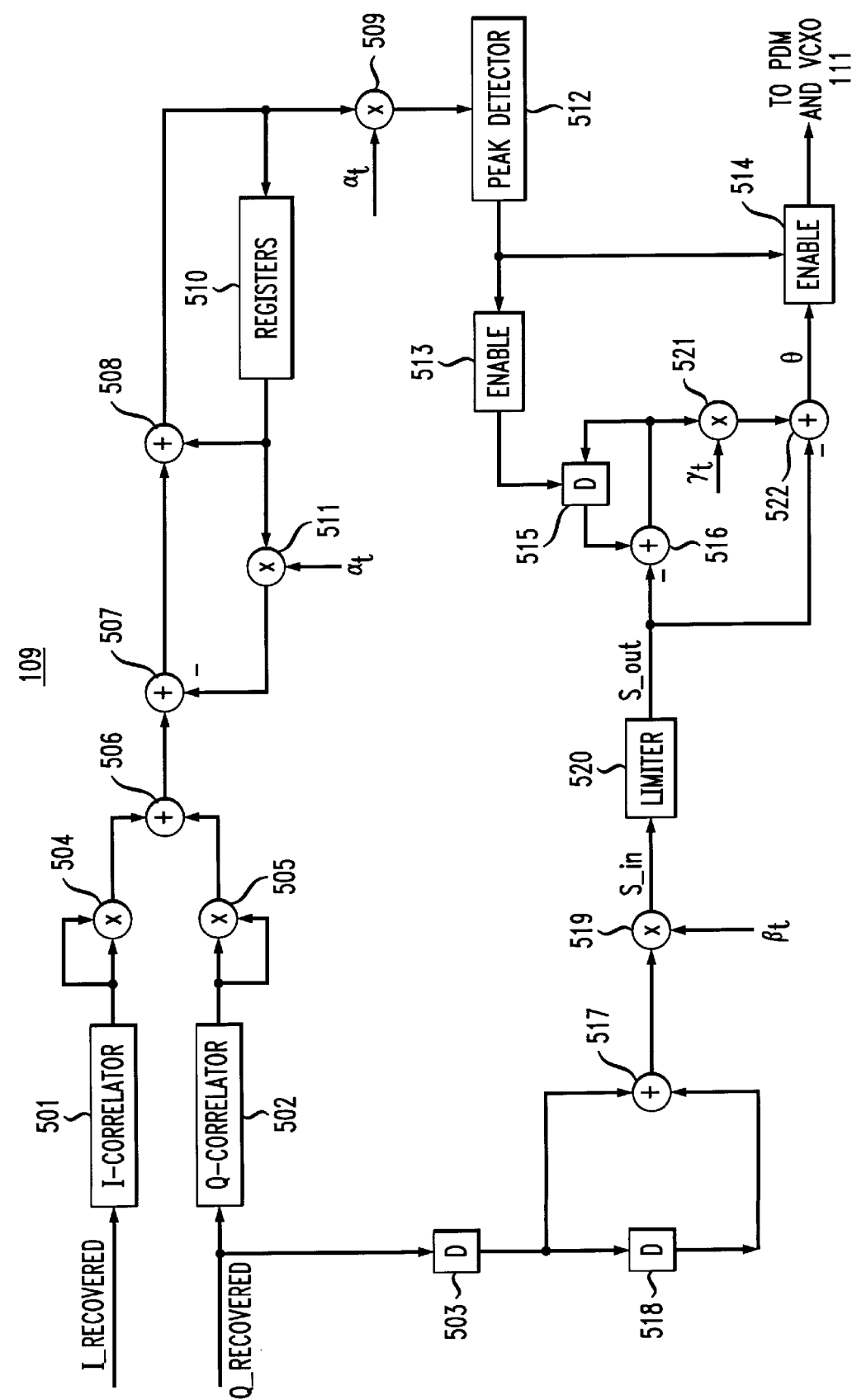
FIG. 5 illustrates, in simplified block diagram form, details of the timing recovery unit of FIG. 1.

FIG. 5 shows, in simplified form, details of timing recovery unit 109 of FIG. 1. I_recovered from FIG. 3 is supplied to I_correlator 501, while Q_recovered is supplied to Q-correlator 502 and delay unit 503. I-correlator 501 and Q-correlator 502 obtain correlated values of I and Q by searching for predetermined patterns in I_recovered and Q_recovered, respectively. Thus, I-correlator 501 yields I_correlated and Q-correlator 502 yields Q_correlated. Details of I-correlator 501 and Q-correlator 502 are described below in relationship to FIG. 6 and FIG. 7, respectively. I_correlated is supplied to multiplier 504 where it is squared. Similarly, Q_correlated is supplied to multiplier 505 where it is squared. The squared values of I_correlated and Q_correlated are supplied to combining unit 506 where they are summed. In turn, the summed values of I_correlated and Q_correlated are supplied to an input of combining unit 507. An output from multiplier 511 is supplied to another input of combining unit 507, where it is algebraically subtracted from the input from combining unit 506. An output from combining unit 507 is supplied to an input of combining unit 508 where it is algebraically summed with an output from registers unit 510. The output from registers unit 510 is also supplied to multiplier 511 where it is multiplied by $\alpha_1$. In this example, $\alpha_1 = 2^{-W_1}$, where $W_1$ has a range of 2–10 and typically is 6. An output from combining unit 508 is supplied to an input of registers unit 510 and to multiplier 509. Registers unit 510 includes a plurality of registers in a sequence, in this example, 832 registers. It is noted that combining units 507 and 508, registers unit 510 and multiplier 511. From essentially an IIR filter. Then, starting with register zero (0) of registers unit 510 and clocking through register 831, the value in each of the 832 registers is IIR filtered in sequence and supplied to multiplier 509, where the supplied value is multiplied by $\alpha$. The resulting output from multiplier 509 is a correlation average, which is supplied to peak detector 512. While cycling through the registers of registers unit 510, peak detector 512 selects the maximum value and generates an enable signal only during the duration that the corresponding register having the maximum value of all the registers during a current cycle is being clocked. The enable signal is supplied to enable unit 513 and enable unit 514. Enable unit 513 is operative to enable standard delay unit 515 to pass the current value at its input to an input of combining unit 516 during the current clock interval, otherwise the last previous value is supplied as an output from delay unit 515. Similarly, enable unit 514 is enabled to pass a current value supplied to its input when enabled and to pass the last previous value supplied to its input otherwise.

An output from delay unit 503 is supplied to an input of combining unit 517 and to an input of delay unit 518. An output from delay unit 518 is supplied to another input of combining unit 517, where it is algebraically summed with the output of delay unit 503. Combining unit 517 yields at its output the sum two consecutive values of Q_recovered, which is supplied to multiplier 519. Multiplier 519 multiplies the output from combining unit 517 by $\beta_1 = 2^{-X_1}$, where $X_1$ has a range of 2–10 and a typical value of 3. The output from multiplier 519 is a smoothed, i.e., average, value S_in of the summed values of Q_recovered, which is supplied to an input of limiter 520. The output S_out of limiter 520 is determined as follows:

S_out=S_in, if |S_in|≤$\Delta_1$ and

S_out=sign (S_in)*.$\delta_1$, if |S_in|>$\Delta_1$, where $\Delta_1$ has a range of $2^5$–$2^8$ and, in this example, is typically $2^7$ and where $\delta_1$ has range of $2^5$–$2^8$ and, in this example, is typically $2^7$.

S_out from limiter 520 is supplied to an input of combining unit 516, where it is algebraically subtracted from the output from delay unit 515, and to an input of combining unit 522. An output from combining unit 516 is supplied to an input of delay unit 515 and to multiplier 521, where it is multiplied by $\gamma_1 \cdot \gamma_1 = 2^{Y_1}$ where $Y_1$ has a range of 8–16 and, in this example, a typical value of 10. An output from multiplier 521 is a frequency offset value and is also supplied to an input of combining unit 522. Combining unit 522 algebraically subtracts the S_out output from limiter 520 from the output from multiplier 521 to yield timing control signal θ. Again, enable unit 514 is enabled by the output from peak detector 512 to supply as an output the current value of θ, otherwise the last previous value of timing control signal θ is supplied as an output. Timing control signal θ is supplied to VCXO 111 (FIG. 1) and to PDM (not shown).

Figure 6:
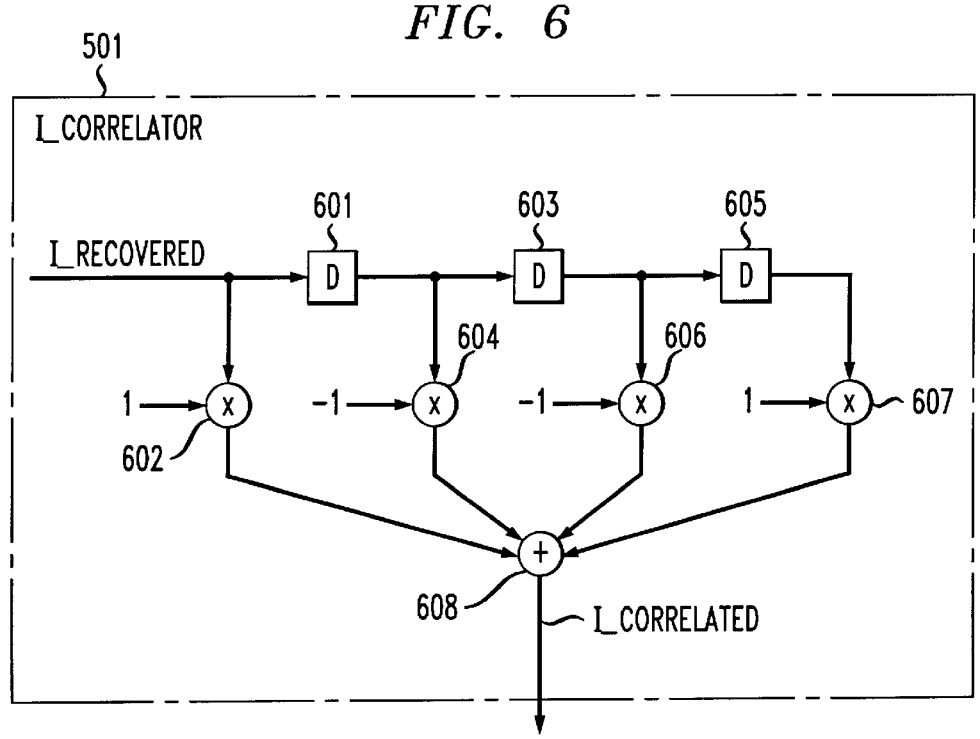
FIG. 6 illustrates, in simplified form, details of the I-Correlator of FIG. 5.

Details of I-correlator 501 are shown, in simplified form in FIG. 6. I-correlator 501 is employed to correlate I_recovered by a predetermined pattern, in this example, 1, –1, 1, –1. When this pattern is found the output from I-correlator 501 is a maximum. To this end, I_recovered is supplied to an input of delay unit 601 and to multiplier 602, where it is multiplied by 1. An output from multiplier 602 is supplied to an input of combining unit 608. An output from delay unit 601 is supplied to an input of delay unit 603 and to multiplier 604, where it is multiplied by –1. An output from multiplier 604 is supplied to an input of combining unit 608. An output from delay unit 603 is supplied to an input of delay unit 605 and to multiplier 606, where it is multiplied by –1. An output from multiplier 606 is supplied to an input of combining unit 608. An output from delay unit 605 is supplied to multiplier 607, where it is multiplied by 1. An output from multiplier 607 is supplied to an input of combining unit 608. Combining unit 608 algebraically sums the outputs from multipliers 602, 604, 606 and 607 to yield I_correlated.

Figure 7:
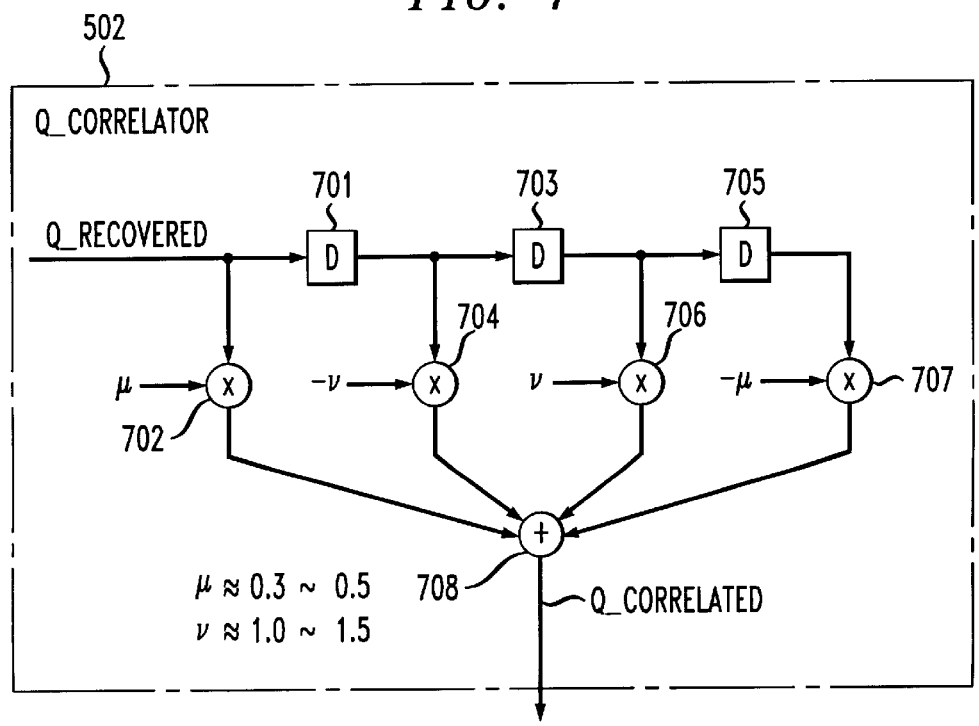
FIG. 7 illustrates, in simplified form, details of the Q-Correlator of FIG. 5.

Details of Q-correlator 502 are shown, in simplified form, in FIG. 7. Q-correlator 502 is employed to correlate Q_recovered by a predetermined pattern in this example, $\mu$, –ν, $\mu$, –ν. When this pattern is found the output from Q-correlator 502 is a maximum. To this end, Q_recovered is supplied to an input of delay unit 701 and to multiplier 702, where it is multiplied by $\mu$. An output from multiplier 702 is supplied to an input of combining unit 708. An output from delay unit 701 is supplied to an input of delay unit 703 and to multiplier 704, where it is multiplied by –ν. An output from multiplier 704 is supplied to an input of combining unit 708. An output from delay unit 703 is supplied to an input of delay unit 705 and to multiplier 706, where it is multiplied by ν. An output from multiplier 706 is supplied to an input of combining unit 708. An output from delay unit 705 is supplied to multiplier 707, where it is multiplied by $\mu$. An output from multiplier 707 is supplied to an input of combining unit 708. Combining unit 708 algebraically sums the outputs from multipliers 702, 704, 706 and 707 to yield Q_correlated. In this example, typical values for $\mu$ and ν are: $\mu \approx 0.3$–0.5 and ν≈1.0–1.5.

What is claimed is:

1. A carrier recovery system for use in a demodulator comprising:
   a complex filter adapted to be supplied with signals representative of an in-phase component and a quadrature-phase component of an incoming signal for generating a phase error signal, said complex filter including a first mode of operation that is a relatively rapid acquisition mode and a second mode of operation and a second mode of operation that is a significantly slower tracking mode than said first mode;
   a complex multiplier for generating a demodulated version of said in-phase component including an amplitude value and a demodulated version of said quadrature-phase component including an amplitude value;
   said complex filter generating a first average value of said amplitude value of said demodulated version of said in-phase component and a second average value of said amplitude value of said demodulated version of said quadrature-phase component; and
   control apparatus for controllably switching said complex filter from said first mode of operation to said second mode of operation in accordance with prescribed criteria.

2. The invention as defined in claim 1 further including apparatus for generating a third average value of said first average value and a fourth average value of said second average value.

3. The invention as defined in claim 2 wherein said control apparatus includes a comparator for comparing the magnitude of said fourth average with a modified version of the magnitude of said third average for generating a switching control signal indicative of whether said complex filter is to be in the acquisition mode or switched to the tracking mode.

4. The invention as defined in claim 3 wherein said control apparatus includes a comparator, said comparator compares the magnitude of said fourth average with a first modified version of the magnitude of said third average and wherein said control apparatus further includes a counter for counting a number of cycles in which said fourth average is smaller in value than the first modified version of the magnitude of said third average, the result of said counting indicating when switching is to occur from said acquisition mode to said tracking mode.

5. The invention as defined in claim 4 wherein said control apparatus effects switching from said acquisition mode to said tracking mode when the magnitude of said fourth average is smaller in value than the first modified version of the magnitude of said third average and said counter reaches a count that is equal to or greater than said predetermined number.

6. The invention as defined in claim 4 wherein said complex filter has a first predetermined phase when the magnitude of said fourth average is smaller in value than the first modified version of the magnitude of said third average.

7. The invention as defined in claim 3 wherein said control apparatus includes a comparator, said comparator compares the magnitude of said fourth average with a second modified version of the magnitude of said third average and wherein said control apparatus further includes a counter, said counter being set to a count of a predetermined value when said fourth average is smaller in value than the second modified version of the magnitude of said third average.

8. The invention as defined in claim 7 wherein said complex filter has a second predetermined phase when the magnitude of said fourth average is smaller in value than the second modified version of the magnitude of said third average.

9. The invention as defined in claim 3 wherein said control apparatus includes a comparator, said comparator compares the magnitude of said fourth average with a first modified version of the magnitude of said third average and with a second modified version of the magnitude of said third average and wherein said control apparatus further includes a counter, said counter being set to a count of a predetermined value when the magnitude of said fourth average is equal to or greater than a first modified version of the magnitude of said third average and equal to or greater than a second modified version of the magnitude of said third average.

10. The invention as defined in claim 9 wherein said complex filter has a third predetermined phase when the magnitude of said fourth average is equal to or greater than a first modified version of the magnitude of said third average and equal to or greater than a second modified version of the magnitude of said third average.

11. The invention as defined in claim 3 wherein said complex filter has a first predetermined bandwidth when said complex filter is in the acquisition mode.

12. The invention as defined in claim 11 wherein said complex filter has a second predetermined bandwidth when said complex filter is in said tracking mode, the first predetermined bandwidth being significantly narrower than said second predetermined bandwidth.

13. The invention as defined in claim 3 wherein said complex filter is adjusted to have a linear phase in said tracking mode.

14. The invention as defined in claim 3 wherein said complex filter further includes additional apparatus for generating a modified version of said first average and a modified version of said second average, and further includes a first controllable selector supplied with said first average and said modified version of said first average, and a second controllable selector supplied with said second average and said modified version of said second average, said first controllable selector being responsive to said switching control signal to either select said modified version of said first average when said complex filter is in said acquisition mode or said first average when in the tracking mode, said second controllable selector being responsive to said switching control signal to either select said modified version of said second average when said complex filter is in said acquisition mode or said second average when said complex filter is in the tracking mode.

15. The invention as defined in claim 2 wherein said complex filter further includes apparatus supplied with said second average and predetermined parameters for generating a frequency control signal.

16. The invention as defined in claim 15 wherein said apparatus for generating a frequency control signal includes apparatus for obtaining the sign of said second average and a selector for selecting from a plurality of phase values in response to a supplied parameter when in the acquisition mode and selecting said supplied parameter when in the tracking mode.

17. The invention as defined in claim 16 wherein said apparatus for generating a frequency control signal employs a fixed bitwidth (F) determined in accordance with a predetermined formula.

18. The invention as defined in claim 17 wherein said predetermined formula comprises F=O+w, where F is the bitwidth, where O has a range of 10–16 and a typical value of 14, and $$w = \log_2\left(\frac{\text{max. carrier} \cdot \text{freq. offset}}{\text{symbol} \cdot \text{freq.}} \cdot 2^B\right) + 1,$$

where B has a typical value of 16.

19. A carrier recovery system for use in a demodulator comprising:
complex filter means adapted to be supplied with signals representative of an in-phase component and a quadrature-phase component of an incoming signal for generating a phase error signal said complex filter means including a first mode of operation that is a relatively rapid acquisition mode and a second mode of operation and a second mode of operation that is a significantly slower tracking mode than said first mode;
complex multiplier means for generating a demodulated version of said in-phase component including an amplitude value and a demodulated version of said quadrature-phase component including an amplitude value;
said complex filter means generating a first average value of said amplitude value of said demodulated version of said in-phase component and a second average value of said amplitude value of said demodulated version of said quadrature-phase component; and
control means for controllably switching said complex filter from said first mode of operation to said second mode of operation in accordance with prescribed criteria.

20. The invention as defined in claim 19 further including means for generating a third average value of said first average value and a fourth average value of said second average value.

21. The invention as defined in claim 20 wherein said control means includes comparator means for comparing the magnitude of said fourth average with a modified version of the magnitude of said third average for generating a switching control signal indicative of whether said complex filter means is to be in the acquisition mode or switched to the tracking mode.

22. The invention as defined in claim 20 wherein said control means includes comparator means for comparing the magnitude of said fourth average with a first modified version of the magnitude of said third average and wherein said control means further includes counter means for counting a number of cycles in which said fourth average is smaller in value than the first modified version of the magnitude of said third average, the result of said counting indicating when switching is to occur from said acquisition mode to said tracking mode.

23. The invention as defined in claim 22 wherein said control means effects switching from said acquisition mode to said tracking mode when the magnitude of said fourth average is smaller in value than the first modified version of the magnitude of said third average and said counter reaches a count that is equal to or greater than a predetermined number.

24. The invention as defined in claim 22 wherein said complex filter means has a first predetermined phase when the magnitude of said fourth average is smaller in value than the first modified version of the magnitude of said third average.

25. The invention as defined in claim 20 wherein said control means includes comparator means for comparing the magnitude of said fourth average with a second modified version of the magnitude of said third average and wherein said control apparatus further includes counter means for counting, said counter means being set to a count of a predetermined value when said fourth average is smaller in value than the second modified version of the magnitude of said third average.

26. The invention as defined in claim 25 wherein said complex filter means has a second predetermined phase when the magnitude of said fourth average is smaller in value than the second modified version of the magnitude of said third average.

27. The invention as defined in claim 20 wherein said control means includes comparator means for comparing the magnitude of said fourth average with a first modified version of the magnitude of said third average and with a second modified version of the magnitude of said third average and wherein said control means further includes counter means for counting, said counter means being set to a count of a predetermined value when the magnitude of said fourth average is equal to or greater than a first modified version of the magnitude of said third average and equal to or greater than a second modified version of the magnitude of said third average.

28. The invention as defined in claim 27 wherein said complex filter means has a third predetermined phase when the magnitude of said fourth average is equal to or greater than a first modified version of the magnitude of said third average and equal to or greater than a second modified version of the magnitude of said third average.

29. The invention as defined in claim 22 wherein said complex filter means has a first predetermined bandwidth when said complex filter means is in the acquisition mode.

30. The invention as defined in claim 29 wherein said complex filter has a second predetermined bandwidth when said complex filter means is in said tracking mode, the first predetermined bandwidth being significantly narrower than said second predetermined bandwidth.

31. The invention as defined in claim 21 wherein said complex filter means is adjusted to have a linear phase in said tracking mode.

32. The invention as defined in claim 21 wherein said complex filter means further includes additional means for generating a modified version of said first average and a modified version of said second average, and further includes first controllable selector means supplied with said first average and said modified version of said first average for supplying as an output either said first average or said modified version of said first average, and second controllable selector means supplied with said second average and said modified version of said second average for supplying as an output either said second average or said modified version of said second average, said first controllable selector means being responsive to said switching control signal to either select said modified version of said first average when said complex filter is in said acquisition mode or said first average when in the tracking mode, said second controllable selector means being responsive to said switching control signal to either select said modified version of said second average or said second average when said complex filter means is in said acquisition mode or said second average when said complex filter means is in the tracking mode.

33. The invention as defined in claim 20 wherein said complex filter means further includes means supplied with said second average and predetermined parameters for generating a frequency control signal.

34. The invention as defined in claim 33 wherein said means for generating a frequency control signal includes means for obtaining the sign of said second average and selector means for selecting from a plurality of phase values in response to a supplied parameter when in the acquisition mode and selecting said supplied parameter when in the tracking mode.

35. The invention as defined in claim 34 wherein said means for generating a frequency control signal employs a fixed bitwidth (F) determined in accordance with a predetermined formula.

36. The invention as defined in claim 35 wherein said predetermined formula comprises F=O+w, where F is the bitwidth, where O has a range of 10–16 and a typical value of 14, and $$w = \log_2\left(\frac{\text{max. carrier} \cdot \text{freq. offset}}{\text{symbol} \cdot \text{freq.}} \cdot 2^B\right) + 1,$$

where B has a typical value of 16.

37. Apparatus for receiving an incoming signal including at least a tuner and a demodulator, the demodulator including a carrier recovery system, the carrier recovery system comprising:
- a complex filter adapted to be supplied with signals representative of an in-phase component and a quadrature-phase component of an incoming signal for generating a phase error signal said complex filter including a first mode of operation that is a relatively rapid acquisition mode and a second mode of operation and a second mode of operation that is a significantly slower tracking mode than said first mode;
- a complex multiplier for generating a demodulated version of said in-phase component including an amplitude value and a demodulated version of said quadrature-phase component including an amplitude value;
- said complex filter generating a first average value of said amplitude value of said demodulated version of said in-phase component and a second average value of said amplitude value of said demodulated version of said quadrature-phase component;
- control apparatus for controllably switching said complex filter from said first mode of operation to said second mode of operation in accordance with prescribed criteria; and
- apparatus for generating a frequency control signal that is supplied to controllably adjust the frequency of the tuner.

38. The invention as defined in claim 37 further including apparatus for generating a third average value of said first average value and a fourth average value of said second average value.

39. The invention as defined in claim 38 wherein said control apparatus includes a comparator for comparing the magnitude of said fourth average with a modified version of the magnitude of said third average for generating a switching control signal indicative of whether said complex filter is to be in the acquisition mode or switched to the tracking mode.

40. Apparatus for receiving an incoming signal including at least a tuner and a demodulator, the demodulator including a carrier recovery system, the carrier recovery system comprising:
- complex filter means adapted to be supplied with signals representative of an in-phase component and a quadrature-phase component of an incoming signal for generating a phase error signal, said complex filter means including a first mode of operation that is a relatively rapid acquisition mode and a second mode of operation and a second mode of operation that is a significantly slower tracking mode than said first mode;
- complex multiplier means for generating a demodulated version of said in-phase component including an amplitude value and a demodulated version of said quadrature-phase component including an amplitude value;
- said complex filter means generating a first average value of said amplitude value of said demodulated version of said in-phase component and a second average value of said amplitude value of said demodulated version of said quadrature-phase component; and
- control means for controllably switching said complex filter from said first mode of operation to said second mode of operation in accordance with prescribed criteria.

41. The invention as defined in claim 40 further including means for generating a third average value of said first average value and a fourth average value of said second average value.

42. The invention as defined in claim 41 wherein said control means includes comparator means for comparing the magnitude of said fourth average with a modified version of the magnitude of said third average for generating a switching control signal indicative of whether said complex filter means is to be in the acquisition mode or switched to the tracking mode.

43. The invention as defined in claim 1 wherein said complex filter is a vector tracking filter.

44. The invention as defined in claim 19 wherein said complex filter means includes vector tracking filter means.

45. The invention as defined in claim 37 wherein said complex filter includes a vector tracking filter.

46. The invention as defined in claim 40 wherein said complex filter means includes vector tracking filter means.

* * * * *